United States Patent [19]

Gerharz et al.

[11] Patent Number: 5,665,816
[45] Date of Patent: Sep. 9, 1997

[54] AQUEOUS DISPERSIONS FOR ADHESIVES

[75] Inventors: Bettina Gerharz, Mainz; Helmut Hintz, Karben, both of Germany

[73] Assignee: Hoechst Aktiengesellschaft, Frankfurt am Main, Germany

[21] Appl. No.: 521,416

[22] Filed: Aug. 30, 1995

[30] Foreign Application Priority Data

Sep. 2, 1994 [DE] Germany .................. 44 31 344.6

[51] Int. Cl.⁶ .................. C08L 1/26; C08L 51/02; C08L 51/04; C08L 51/06
[52] U.S. Cl. .................. 524/733; 527/311; 527/313; 527/314
[58] Field of Search .................. 524/733; 527/311, 527/313, 314

[56] References Cited

U.S. PATENT DOCUMENTS

| | | | |
|---|---|---|---|
| 3,703,492 | 11/1972 | Masuda et al. | 260/27 |
| 4,128,518 | 12/1978 | Oyamada et al. | 524/732 |
| 4,164,489 | 8/1979 | Daniels et al. | 524/733 |
| 4,654,388 | 3/1987 | Lofgren | 524/272 |
| 4,731,402 | 3/1988 | Penzel et al. | 524/273 |
| 4,997,879 | 3/1991 | Weissgerber et al. | 524/823 |

FOREIGN PATENT DOCUMENTS

| | | |
|---|---|---|
| 1332485 | 10/1994 | Canada. |
| 0 295 727 | 12/1988 | European Pat. Off.. |
| 0 327 376 | 8/1989 | European Pat. Off.. |
| 0 365 980 | 5/1990 | European Pat. Off.. |
| 0 539 710 | 5/1993 | European Pat. Off.. |
| 2 301 497 | 8/1973 | Germany. |
| 1407287 | 9/1975 | United Kingdom. |

*Primary Examiner*—Nathan M. Nutter
*Attorney, Agent, or Firm*—Foley & Lardner

[57] ABSTRACT

Aqueous dispersions prepared by polymerization of vinyl acetate, ethylene, and comonomers selected from the group consisting of vinyl esters of aliphatic ($C_3$–$C_{18}$)-carboxylic acids, acrylic acid esters, methacrylic acid esters, and maleic acid diesters of aliphatic ($C_1$–$C_{18}$)-alcohols in the presence of 0.05 to 0.95% by weight of $\alpha,\beta$-unsaturated carboxylic acids, 0 to 0.95% by weight of methacrylic acid esters or acrylic acid esters which carry epoxide or hydroxyl groups, and 1.5 to 20% by weight of cellulose ether, to form a copolymer having a glass transition temperature of −40° to 0° C. and comprising a cellulose ether in at least partly grafted form, are suitable as adhesives, for example, for gluing polyolefins.

17 Claims, No Drawings

AQUEOUS DISPERSIONS FOR ADHESIVES

BACKGROUND OF THE INVENTION

1. Field of the Invention

The present invention relates to aqueous dispersions which comprise cellulose ethers in at least partly grafted form, processes for their preparation and the advantageous use of dispersions comprising these cellulose ethers for gluing, in particular for gluing polyolefins.

2. Description of Related Art

Aqueous copolymer dispersions based on vinyl acetate and ethylene are used in wide fields of the adhesives sector. The adhesives are optimized to a very high level above other adhesives in the packaging sector, in floor adhesives, in the furniture film field, and in many other areas of use. Although the adhesives available on the market to date meet the requirements regarding the desired adhesive force, measured as the shear and peel strength, on the usual materials, such as PVC, polyester, and polyurethanes, they do not do so on substitute materials for PVC, in particular polyolefin coverings and polyolefin films, which are being used increasingly instead of PVC films and floor coverings because of the disposal problems of halogenated products made of plastic.

Various routes are currently taken to overcome the wetting and gluing difficulties which occur with these polyolefin materials. For example, the use of solvent-containing primers (EP-A 0 539 710) or the development of adhesives based on modified rubbers (Polym. Prep., Jpn. Engl. Ed. 38(2) page E658, (1989)) has been mentioned. Other approaches lie in modification of the polyolefin materials to be glued by gas phase fluorination. In this case, the polymer surface is functionalized by reaction with fluorine. The current state of the art is that the desired gluing strengths can be achieved on polyolefins only by fluorination (Kleben und Dichten, 38(6), 1994, 21–24).

A solution for gluing untreated polyolefin coverings is urgently sought, specifically in the field of aqueous floor adhesives, since the action of the pretreatment cannot be retained over the storage period under the different storage conditions of the covering materials, and also any other modification requires an additional further working operation and therefore gives rise to costs.

Floor adhesives based on aqueous dispersions for gluing all the usual floor coverings, including parquet, have established themselves on the market. They are described in Patent Applications DE-A 23 01 497 and EP-A 0 221 461 and comprise an aqueous binder in the form of a plastics dispersion, resins, and fillers. The resin is generally built up from colophony, tall resins, or esters of the natural resins mentioned, and is used in organic, low-boiling solvents having a flash point below 55° C. Such floor adhesives, which comprise 3 to 5% by weight of toluene or also xylene, are now regarded as outdated and can be employed under only limited conditions because of existing hazardous substances legislation.

Resin formulations, although they are regarded as solvent-free, generally comprise high-boiling solvents, such as butyldiglycol, butyldiglycol acetate, dibutyl phthalate or else high-boiling ethers, such as diethylene glycol monobutyl ether, or else polyethylene glycol dimethyl ether, ethylene glycol dimethyl ether or di- or triethylene glycol dimethyl ether, as well as polymeric plasticizers have preferably been used for modification of adhesives. U.S. Pat. No. 4,654,388 and DE-A 20 19 233 describe floor adhesives which comprise a film-forming vinyl acetate/ethylene/acrylate latex, filler, diethylene glycol monobutyl ether or dibutyl phthalate and a mixture of colophony resin and esters.

Adhesives which are free from natural resin and are based on vinyl acetate/ethylene can be improved by incorporation of functional comonomers. In GB-A 1 407 827 and EP-A 0 327 376, hydrolyzable silicon compounds are copolymerized for this purpose. EP-A 0 365 980 carries out the polymerization in the presence of 1 to 5% by weight of an olefinically unsaturated carboxylic acid. According to EP-A 0 216 210, the simultaneous presence of ethylenically unsaturated carboxylic acids and hydroxyalkyl-functional compounds is necessary.

An alternative process for the preparation of an improved adhesive based on vinyl acetate/ethylene proposes the use of certain dispersing agents. In DE-A 27 18 716, vinyl acetate and ethylene are polymerized in the presence of 1 to 8% by weight of a nonionic surfactant of the polyglycol ether type and 0.1 to 1% by weight of a water-soluble high molecular weight protective colloid for this purpose. EP-A 0 295 727 also proposes polymerization in the presence of customary emulsifiers and protective colloids. The protective colloids are added in an amount of 0.02 to 2% by weight, based on the emulsion, corresponding to 0.005 to 1.3% by weight, based on the monomers. Small amounts of cellulose ether are used as protective colloids in these dispersions based on vinyl acetate and ethylene, in order to increase the stability and to be able to prepare fine-particle dispersions. The protective colloid component is employed in the range up to 1.3% by weight here. Adhesives prepared in this manner show an outstanding adhesive force, for example on polyvinyl chloride, polystyrene and polyester materials, but not on untreated, non-modified polyolefin materials (Comparison Example 2).

The floor adhesives prepared with the known customary plastics dispersions and adhesive recipes are not capable of gluing coverings based on polyolefins with adequate strength. The copolymer dispersions according to the present invention have been developed in order also to be able to meet the conditions required on untreated polyolefin coverings.

SUMMARY OF THE INVENTION

The object of the present invention was thus to develop an adhesive dispersion based on ethylene and vinyl acetate having a glass transition temperature of 0° to –40° C., which exceeds the recommended values for gluing which apply to the customary materials and meets these recommended values, without requiring the addition of primers or solvents, for untreated polyolefin materials (for chemical and physical surface treatment, cf. "Kleben: Grundlagen Technologie Anwendungen" (Gluing: Principles Technology Applications)", Springer-Verlag, Berlin 1986).

It is also an object of the invention to provide methods of making and using such adhesives.

In accordance with these objectives, there has been provided an aqueous dispersion which is prepared by aqueous polymerization of vinyl acetate, ethylene and at least one comonomer selected from the group consisting of vinyl esters of aliphatic ($C_3$–$C_{18}$)-carboxylic acids, acrylic acid esters, methacrylic acid esters, and maleic acid diesters of aliphatic ($C_1$–$C_{18}$)-alcohols, in the presence of 0.05 to 0.95% by weight of $\alpha,\beta$-unsaturated carboxylic acids, 0 to 0.95% by weight of methacrylic acid esters or acrylic acid esters which carry epoxide or hydroxyl groups, and 1.5 to 20% by weight of cellulose ether, in each case based on the total weight of the monomers employed, to form an aqueous dispersion of a coplymer containing said cellulose ether in at least partly grafted form;

wherein said copolymer has a glass transition temperature of −40° to 0° C.

In accordance with these objectives, there has also been provided a process for preparing an aqueous dispersion, which comprises aqueous polymerization of vinyl acetate, ethylene, and at least one comonomer selected from the group consisting of vinyl esters of aliphatic $(C_3-C_{18})$-carboxylic acids, acrylic acid esters, methacrylic acid esters, and maleic acid diesters of aliphatic $(C_1-C_{18})$-alcohols;

in the presence of 0.05 to 0.95% by weight of $\alpha,\beta$-unsaturated carboxylic acids, 0 to 0.95% by weight of methacrylic acid esters or acrylic acid esters which carry epoxide or hydroxyl groups, and 1.5 to 20% by weight of cellulose ether, in each case based on the total weight of the monomers employed, thereby forming an aqueous dispersion of a coplymer containing said cellulose ether in at least partly grafted form;

wherein said copolymer has a glass transition temperature of −40° to 0° C.

In accordance with the invention, there is also provided methods of using the dispersions, such as adhesives for gluing plastic materials.

Further objects, features, and advantages of the invention will become apparent from the detailed description of preferred embodiments that follows.

DETAILED DESCRIPTION OF PREFERRED EMBODIMENTS

It has been possible to achieve objects of the invention by providing an aqueous dispersion which has been obtained by polymerization of vinyl acetate, ethylene and other vinyl esters, acrylic esters, methacrylic esters and/or maleic diesters in the presence of 0.05 to 0.95, preferably 0.75% by weight of $\alpha,\beta$-unsaturated carboxylic acids and 1.5 to 20% by weight of cellulose ethers based on the total weight of the monomers employed. The resultant dispersion includes the cellulose ethers in at least partly grafted form.

The present invention thus relates to an aqueous dispersion which comprises a cellulose ether in at least partly grafted form and a copolymer having a glass transition temperature of −40° to 0° C., prepared by polymerization of vinyl acetate, ethylene and comonomers from the group consisting of vinyl esters of aliphatic $(C_3-C_{18})$-carboxylic acids, acrylic acid esters, methacrylic acid esters, and maleic acid diesters of aliphatic $(C_1-C_{18})$-alcohols in the presence of 0.05 to 0.95% by weight of $\alpha,\beta$-unsaturated carboxylic acids, 0 to 0.95% by weight of methacrylic acid esters or acrylic acid esters which carry epoxide or hydroxyl groups and 1.5 to 20% by weight of cellulose ethers, in each case based on the total weight of the monomers employed.

Suitable vinyl esters include any in the art and are, preferably, vinyl esters of aliphatic monocarboxylic acids having 3 to 12 carbon atoms, for example vinyl propionate, vinyl butyrate, vinyl caproate, vinyl laurate, vinyl decanoate, and Versatic® acid vinyl ester (Shell-Chemical).

Suitable acrylates and methacrylates include any known in the art, and are, preferably, acrylic acid esters of monohydric alcohols having 1 to 12 carbon atoms, for example, methyl acrylate, ethyl acrylate, butyl acrylate and 2-ethylhexyl acrylate, and methacrylic acid esters of monohydric alcohols having 1 to 12 carbon atoms, for example, methyl methacrylate, ethyl methacrylate, butyl methacrylate and 2-ethylhexyl methacrylate.

Suitable maleic acid diesters include any known in the art, and are, preferably, esters of monohydric aliphatic alcohols having 1 to 12 carbon atoms, for example, dibutyl maleate, dihexyl maleate, and dioctyl maleate. The alcohol residues of the acrylic and methacrylic acid esters and maleic acid diesters can comprise linear and/or branched alkyl chains.

The amounts by weight of vinyl acetate, ethylene, and the comonomers of the group consisting of vinyl esters, acrylates, methacrylic esters, and maleic acid diesters are chosen such that plastics dispersions are formed where the glass transition temperature of the copolymers is in the range from −40° to 0° C., preferably in the range from −20° to −5° C. The dispersion can also have a wide freezing range as well as a second glass transition temperature or a melting range, as long as the polymer has a glass transition temperature of −40° to 0° C., preferably −20° to −5° C., so that a minimum film-forming temperature below 0° C. is ensured.

The copolymers according to the invention are preferably built up from 50 to 70% by weight of vinyl acetate, 1.5 to 9.5% by weight of ethylene, and more than 25% by weight of monomers selected from the group consisting of vinyl esters of aliphatic $(C_3-C_{12})$-carboxylic acids, acrylic acid esters, methacrylic acid esters, and maleic acid diesters of aliphatic $(C_1-C_{12})$-alcohols, in each case based on the total weight of the monomers employed.

Preferably, the copolymers according to the invention comprise more than 25% by weight, based on the total weight of the monomers employed, of monomer units from the group consisting of 2-ethylhexyl acrylate and vinyl esters of $\alpha$-dialkyl-branched $(C_{10}-C_{11})$-carboxylic acids, for example Veova® 10 and Veova® 11 (Shell-Chemical).

Any $\alpha,\beta$-unsaturated carboxylic acid can be used in the present invention, such as acrylic or methacrylic acids. The copolymers preferably include, as $\alpha,\beta$-unsaturated carboxylic acids, 0.1 to 0.7% by weight, in particular 0.15 to 0.45% by weight, based on the total weight of the monomers employed, of acid, preferably acrylic acid and/or methacrylic acid.

The copolymers optionally include methacrylic or acrylic acid esters which are modified with one or more of epoxide groups and/or hydroxyl groups. Any such ester can be used. Preferred examples include glycidyl methacrylate, hydroxyethyl methacrylate, hydroxyethyl acrylate, hydroxypropyl acrylate, hydroxypropyl methacrylate. The content of these comonomers in the copolymers according to the invention is preferably 0.1 to 0.7% by weight, in particular 0.15 to 0.45% by weight, based on the total weight of the monomers employed. The copolymers may furthermore contain comparable amounts of methacrylic or acrylic acid amides modified with one or several hydroxyl group(s), such as, for example, N-methylolacrylamide.

The dispersions according to the invention preferably contain 1.7 to 15% by weight, in particular 2 to 10% by weight, based on the total weight of the monomers employed, of cellulose ethers. Any desired cellulose ether(s) can be used. For example, methylcellulose, carboxymethylcellulose or hydroxyethylcellulose, in particular hydrophobically modified hydroxyethylcellulose, the preparation of which is described in J. Appl. Polym. Sci., Volume 40, 333–343, 1990, in at least partly grafted form, are preferred.

The particle size of the copolymer particles of the dispersions according to the invention is generally in the range from 0.02 to 1 µm, preferably in the range from 0.05 to 0.4 µm.

The solids content of the dispersions is generally 40 to 65% by weight, preferably 45 to 60% by weight.

The present invention also relates to a process for the preparation of an aqueous dispersion by polymerization of vinyl acetate, ethylene and comonomers selected from the group consisting of vinyl esters of aliphatic ($C_3$–$C_{18}$)-carboxylic acids, acrylic acid esters, methacrylic acid esters and maleic acid diesters of aliphatic ($C_1$–$C_{18}$)-alcohols, in the presence of 0.05 to 0.95% by weight of α,β-unsaturated carboxylic acids, 0 to 0.95% by weight of methacrylic acid esters or acrylic acid esters which carry epoxide or hydroxyl groups, and 1.5 to 20% by weight of cellulose ethers, in each case based on the total weight of the monomers employed.

The dispersion is preferably prepared in a pressure autoclave. For this, the monomers are added continuously or discontinuously, at the desired reaction temperature, to an aqueous solution of the protective colloid or of the protective colloid/emulsifier mixture, (discussed below) all or some of which has been initially introduced into the reaction vessel.

All the polymerization initiators which form free radicals can be employed in the customary amounts for the polymerization of the comonomers. Suitable initiators include, for example, alkali metal and ammonium salts of peroxy acids, such as potassium, sodium and ammonium persulfate, and redox catalysts, for example combinations of ammonium persulfate and ammonium hydrogen sulfate, or hydrogen peroxide and ascorbic acid, or hydrogen peroxide and iron(II) salts, as well as tert-butyl hydroperoxide and sodium formaldehyde-sulfoxylate. Organic peroxides, percarbonates and azo compounds can furthermore also be employed, preferably dibenzoyl peroxide, azoisobutyro-nitrile, tert-butyl peroxydiethylorthoacetate and tert-butyl peroxy-2-ethylhexanoate. The amount of initiators employed is an effective amount and is generally 0.1 to 2% by weight, preferably 0.2 to 1% by weight, based on the total weight of the monomers employed. The initiators mentioned can also be used as a mixture.

The monomers, with the exception of ethylene, can be metered into the reaction in the form of a monomer mixture or in the form of a monomer emulsion. In the case of a monomer emulsion, the emulsion can be stabilized by protective colloids or emulsifiers. The cellulose ethers already mentioned are used as protective colloids for stabilizing the monomer emulsion. Other customary protective colloids and emulsifiers, preferably anionic or nonionic emulsifiers, can also additionally be employed.

In the preparation of the dispersion, the initiator systems mentioned can initially be introduced in their entirety or partly into the reaction autoclave, or partly metered in with the monomer emulsion or as a solution. The monomers can be polymerized continuously or discontinuously, that is to say by the metering process, by the batch process or else by a combined batch/metering process. Preferably, up to 50% by weight, in particular up to 20% by weight, of the monomers, with the exception of ethylene, are initially introduced into the reaction vessel and the remainder is metered in continuously or discontinuously during the polymerization.

For the preparation of the dispersions according to the invention, the ethylene is generally metered into the reaction vessel in gaseous form under an ethylene pressure in the range from 30 to 100 bar, preferably 40 to 80 bar, and at a reaction temperature of 45° to 90° C., preferably 50° to 85° C. The ethylene pressure can be kept constant or varied during the polymerization.

The grafted cellulose ether is present in an amount sufficient to ensure that no phase separation will occur in the resultant dispersion, preferably in an amount of at least 50, in particular 75 mol percent, of the cellulose ether employed.

As a result of the high grafting rates onto the cellulose ethers during the copolymerization according to the invention of ethylene, vinyl acetate, methacrylic and acrylic acid and one or more of esters thereof with ($C_2$–$C_{18}$)-alcohols or maleic acid diesters or vinyl esters, an aqueous dispersion which meets the desired gluing profile for polyolefin materials, in addition to the outstanding pattern of adhesive properties for all the customary materials, for example polyvinyl chloride, polystyrene and polyesters, is formed (See Examples 1–5). This profile of adhesive properties results from the very good wetting capacity of the dispersions thus prepared on all the customary surfaces of plastic and the high adhesion to the substrates which occurs after gluing (Table 1). Surprisingly, this pattern of properties is virtually independent of the molecular weight of the resulting copolymer, and results decisively from the cellulose ether grafting rate.

The dispersions according to the invention can be prepared with an extremely low content of volatile organic constituents (low-VOC), so that they additionally accord with increased environmental awareness. To reduce the VOC, the finished dispersions can be prepared by the process described in EP-B 0 327 006, incorporated by reference. For this process, small amounts of customary defoamers based on natural fats and oils, for example sperm oil, cod-liver oils, paraffin oil, long-chain alcohols, such as fatty alcohols, and highly polymeric glycols and mixtures of these alcohols with fats, as well as fatty acid polyglycol esters, sorbitol monolaurate and silicones, are subsequently added to the finished dispersion. 0.001 to 0.5% by weight, based on the dispersion, is generally used. For removal of residual monomers, the dispersion is distilled, with, for example, 1 l of water being added twice and vacuum being applied, in each case in the course of 2 hours. The total amount of water distilled off is generally 3 l. Dispersions of low residual monomer content having a total VOC content of not more than 0.1% by weight, in particular of not more than 0.05% by weight, are thereby obtained.

The dispersions can be preserved by customary processes in order to protect them from attack by fungi and bacteria. Only very small amounts of biocidal additives need be used for the preservation. On the other hand, preservation can be achieved by heating the finished composition at temperatures of 60° to 120° C. for 15 to 120 minutes, for example by pasteurization or Tyndallization (also called fractional sterilization), and furthermore by cooling, as well as by exclusion or air during storage in gas-tight drums under an inert gas. Ultrasound, UV irradiation and high-frequency fields can also be used for the preservation. Additions of minimal amounts of antibiotics, for example terramycin, streptomycin and subtilin, as well as quinosol (equimolar compound of o-hydroxyquinoline sulfate and potassium sulfate), are also suitable. The following can furthermore be employed in very small amounts as effective agents for preservation: chloroacetamide, sodiumbenzoate, the methyl, ethyl and propyl ester of p-hydroxybenzoic acid and sodium compounds thereof, sodium sorbate, sodium formate, sodium borate and borax, hydrogen peroxide, lactic acid, formic acid, propionic acid, nitrites and nitrates, salicylic acid, dehydroacetic acid, thymol (methylisopropylphenol), barium metaborate, dithiocarbamates, chloromethylisothiazolinone and benzoisothiazolinone.

The present invention also relates to the use of an aqueous dispersion which comprises a cellulose ether in at least partly grafted form and a copolymer having a glass transition temperature of −40° to 0° C., prepared by polymerization of vinyl acetate, ethylene and comonomers selected from the group consisting of vinyl esters of aliphatic ($C_3$–$C_{18}$)-carboxylic acids, acrylic acid esters, methacrylic acid esters and maleic acid diesters of aliphatic ($C_1$–$C_{18}$)-alcohols in the presence of 0.05 to 5% by weight, preferably of 0.05 to 0.95% by weight, of α,β-unsaturated carboxylic acids, 0 to 5% by weight of methacrylic acid esters or acrylic acid esters which carry epoxide or hydroxyl groups and 1.5 to 20% by weight of cellulose ethers, in each case based on the total weight of the monomers employed, as adhesives, in particular, for gluing polyolefins.

The copolymers to be used according to the invention as an adhesive can furthermore be formed from, in addition to the monomer units mentioned, olefinically unsaturated compounds, such as ($C_3$–$C_{12}$)-α-olefins, for example propylene or isobutylene, vinyl ethers, for example, vinyl ethyl ether or vinyl n-butyl ether, and acrylonitrile, methacrylonitrile, vinyl chloride or N-vinylpyrrolidone, in an amount generally of up to 10% by weight, preferably up to 5% by weight, based on the total weight of the monomers employed.

The dispersion polymers tobe used according to the invention as adhesives furthermore can comprise monomer units which contain silicon, for example vinyltrimethoxysilane or vinyltriethoxysilane, generally in an amount of up to 2% by weight, preferably up to 0.5% by weight, in particular up to 0.25% by weight, based on the total weight of the monomers employed.

The aqueous low-VOC dispersion adhesives prepared according to the invention meet the adhesive properties of all the usual plastics materials with very high values. They are extremely stable to possible foreign additions, for example resins, chalks and plasticizers, which are added, for example, for the production of floor adhesives having a filling degree of up to 90% by weight, and to metal salts and other water-soluble polymer additions.

Metal salts which can be admixed with the dispersion as subsequent additions in amounts of up to 10% by weight, based on the weight of the dispersion, include, for example, the halides, sulfates, nitrates, and phosphates, that is to say water-soluble salts, of the metal cations of the elements Ti, V, Cr, Mn, Fe, Co, Ni, Cu, Zn, Ge, Mo, Zr, Ru, Rh, Pd, Ag, Cd, In, Sn, Sb, Al, Si, As, W, Pt, Au, Hg, Pb and Bi, which are listed by way of example. The addition of these metal salts to the polymers according to the invention leads to a significant increase in gluing strength after gluing. An increase in peel strength, tensile shear strength and creep strength both on the customary polymer materials, such as PVC, polyesters and polyurethane foams, and on polyolefin materials, as well as on modified and on non-modified substrates is observed.

The adhesive dispersions according to the invention can subsequently be further modified. For this, for example, water-soluble copolymers based on acrylic or methacrylic acid can be added, such as acrylic acid/acrylamide and methacrylic acid/acrylic ester copolymers, for example also water-soluble copolymers based on styrene/maleic anhydride, ethylene/maleic anhydride, ethylene/acrylic acid and ethylene/methacrylic acid, cellulose derivatives, such as methylcellulose, hydroxyethylcellulose and carboxymethylcellulose, or casein, gum arabic, tragacanth gum, starch, sodium alginate, polyvinyl alcohol, polyvinylpyrrolidone or sodium polyacrylate.

EXAMPLES

The invention is further described with reference to the following examples. The examples are illustrative only and do not limit the invention.

The parts and percentages used in the following examples relate to the weight, unless noted otherwise.

The ethylene content in the copolymers is calculated from the weight of the copolymer solids minus the amounts of the other comonomers employed.

The examples and comparison examples are carried out in a 30 l pressure autoclave with jacket cooling and an approved pressure range up to 120 bar.

Example 1

An aqueous solution comprising the following constituents is introduced into a pressure apparatus with a stirrer, jacket heating and metering pumps:

5000 g of E water (deionized water), 55 g of sodium acetate trihydrate, 2000 g of 20% strength aqueous solution of nonylphenol oxyethylated with 30 mol of ethylene oxide, 4050 g of a 5% strength aqueous hydroxyethylcellulose solution (viscosity of the 2% strength aqueous solution: 300 mPa.s), 225 g of a 30% strength aqueous sodium vinylsulfonate solution, and 12.2 g of ®Rongalit (sodium formaldehyde sulfoxylate, from BASF) as a reducing agent.

The apparatus is freed from atmospheric oxygen, the first part of the monomer mixture is introduced into the apparatus and ethylene is forced into the apparatus.

Monomer mixture in the initial addition:

4200 g of vinyl acetate, 80 g of acrylic acid and 600 g of 2-ethylhexyl acrylate.

The residual monomer mixture which is metered in comprises:

10 g of a mixture of methacrylic acid and acrylic acid, in a mixing ratio of 1:5, 60 g of hydroxyethyl methacrylate, 3000 g of 2-ethylhexyl acrylate, and 4200 g of vinyl acetate.

Initiator solution:

40 g of ammonium persulfate in 630 g of water.

10% of the monomer mixture and 20% of the initiator solution are added under an ethylene pressure of 40 bar at an internal temperature of 45° C. and the ethylene pressure is increased to 50 bar. At an internal temperature of 65° C., the residual monomer mixture is metered in parallel to the initiator solution over a period of 9 hours. The ethylene pressure is kept constant at 50 bar, and when the metering has ended, the ethylene addition is stopped and the internal temperature is kept at this temperature for 2 hours. Most of the ethylene is then gassed out, while stirring, and collected in a gasometer, and the residual monomer content is then reduced by the type of water vapor distillation already described.

Characteristic Data of Dispersion Example 1

| | |
|---|---|
| Dry matter: | 54% |
| pH (electrode measurement): | 4.6 |
| Brookfield viscosity, T = RT, Spindle 5, 20 rpm: | 3600 mPa.s |
| Residual monomer content: | <0.05% |
| Glass transition temperature of the polymer: | −8.5° C. |
| Ethylene content in the polymer: | 538 g |

Example 2

An aqueous solution comprising the following constituents is introduced into a pressure apparatus with a stirrer, jacket heating and metering pumps:

5000 g of E water, 55 g of sodium acetate trihydrate, 2000 g of a 20% strength aqueous solution of nonylphenol oxyethylated with 30 mol of ethylene oxide, 4050 g of a 5% strength aqueous hydroxyethylcellulose solution (viscosity of the 2% strength aqueous solution: 300 mPa.s), 225 g of a 30% strength aqueous sodium vinylsulfonate solution, and 2.7 g of Rongalit as a reducing agent.

The apparatus is freed from atmospheric oxygen and ethylene is forced into the apparatus. The monomer mixture metered in comprises:

60 g of a mixture of methacrylic acid and acrylic acid in a ratio of 1:5, 60 g of glycidyl methacrylate, 3500 g of 2-ethylhexyl acrylate, and 8400 g of vinyl acetate.

Initiator solution:

40 g of ammonium persulfate in 630 g of water.

10% of the monomer mixture and 20% of the initiator solution are added under an ethylene pressure of 40 bar at an internal temperature of 45° C. The reaction mixture is heated up to 80° C. and the ethylene pressure is increased to 55 bar. After 30 minutes, the internal temperature is reduced to 65° C. The monomer mixture is uniformly metered in parallel to the initiator solution over a period of 8 hours. The ethylene pressure is kept constant at 55 bar, and after 4 hours the ethylene addition is stopped, the metering of the monomer and initiator is ended after 8 hours and the internal temperature is kept at this temperature for 2 hours. Most of the ethylene is subsequently gassed out, while stirring, and collected in a gasometer, and the residual monomer content is then reduced by the type of steam distillation already described.

Characteristic Data of Dispersion Example 2

| Dry matter: | 53.5% |
| --- | --- |
| pH (electrode measurement): | 4.6 |
| Residual monomer content: | <0.02% |
| Brookfield viscosity, T = RT, Spindle 5, 20 rpm: | 3000 mPa.s |
| Glass transition temperature of the polymer: | −12° C. |
| Ethylene content in the polymer: | 193 g |

Example 3

An aqueous solution comprising the following constituents is introduced into a pressure apparatus with a stirrer, jacket heating and metering pumps:

5000 g of E water, 55 g of sodium acetate trihydrate, 2000 g of a 20% strength aqueous solution of nonylphenol oxyethylated with 30 mol of ethylene oxide, 4050 g of a 5% strength aqueous hydroxyethylcellulose solution (viscosity of the 2% strength aqueous solution: 300 mPa.s), 225 g of a 30% strength aqueous sodium vinylsulfonate solution, and 2.7 g of Rongalit as a reducing agent.

The apparatus is freed from atmospheric oxygen and ethylene is forced into the apparatus. The monomer mixture metered in comprises:

60 g of a mixture of methacrylic acid and acrylic acid in a ratio of 1:5, 60 g of hydroxyethyl methacrylate, 2800 g of 2-ethylhexyl acrylate, and 9100 g of vinyl acetate.

Initiator solution:

40 g of ammonium persulfate in 630 g of water.

10% of the monomer mixture, and 20% of the initiator solution are added under an ethylene pressure of 40 bar at an internal temperature of 45° C. The reaction mixture is heated up to 80° C. and the ethylene pressure is increased to 50 bar. After 30 minutes, the internal temperature is reduced to 65° C. The monomer mixture is metered uniformly in parallel to the initiator solution over a period of 8 hours. The ethylene pressure is kept constant at 50 bar, and when the metering has ended, the ethylene addition is stopped and the internal temperature is kept at 80° C. for 2 hours. Most of the ethylene is subsequently gassed out, while stirring, and collected in a gasometer, and the residual monomer content is then reduced by the type of steam distillation already described.

Characteristic Data of Dispersion Example 3

| Dry matter: | 55% |
| --- | --- |
| pH (electrode measurement): | 4.7 |
| Residual monomer content: | <0.02% |
| Brookfield viscosity, T = RT, Spindle 5, 20 rpm: | 1250 mPa.s |
| Glass transition temperature of the polymer: | −12° C. |
| Ethylene content in the polymer: | 622 g |

Example 4

An aqueous solution comprising the following constituents is introduced into a pressure apparatus with a stirrer, jacket heating and metering pumps:

5000 g of E water, 55 g of sodium acetate trihydrate, 2400 g of a 20% strength aqueous solution of nonylphenol oxyethylated with 30 mol of ethylene oxide, 5250 g of a 5% strength aqueous hydroxyethylcellulose solution (viscosity of the 2% strength aqueous solution: 300 mPa.s), and 225 g of a 30% strength aqueous sodium vinylsulfonate solution.

The apparatus is freed from atmospheric oxygen and ethylene is forced into the apparatus. The monomer mixture metered in comprises:

60 g of a mixture of methacrylic acid and acrylic acid in a ratio of 1:5, 60 g of hydroxyethyl methacrylate, 2800 g of VeoVall® (Shell Chemie, vinyl ester of a branched $C_{11}$-carboxylic acid), and 9100 g of vinyl acetate.

Initiator solution:

40 g of ammonium persulfate in 630 g of water.

The procedure and residual monomer reduction are carried out in a manner corresponding to that described in Example 3.

Characteristic Data of Dispersion Example 4

| | |
|---|---|
| Dry matter: | 54% |
| pH (electrode measurement): | 4.7 |
| Residual monomer content: | <0.07% |
| Brookfield viscosity, T = RT, Spindle 5, 20 rpm: | 3600 mPa.s |
| Glass transition temperature of the polymer: | −12.5° C. |
| Ethylene content in the polymer: | 1075 g |

Example 5

An aqueous solution comprising the following constituents is introduced into a pressure apparatus with a stirrer, jacket heating and metering pumps:

3000 g of E water,
55 g of sodium acetate trihydrate,
1600 g of a 20% strength aqueous solution of nonylphenol oxyethylated with 30 mol of ethylene oxide,
3050 g of a 5% strength aqueous hydroxyethylcellulose solution (viscosity of the 2% strength aqueous solution: 300 mPa.s),
1050 g of a 5% strength aqueous hydroxyethylcellulose (viscosity of the 2% strength aqueous solution: 4000 mPa.s),
300 g of a 30% strength aqueous sodium vinylsulfonate solution, and
1 g of Rongalit as a reducing agent.

The apparatus is freed from atmospheric oxygen and ethylene is forced into the apparatus. The monomer mixture to be metered in comprises:

60 g of a mixture of methacrylic acid and acrylic acid in a ratio of 1:5,
80 g of hydroxyethyl methacrylate,
1200 g of VeoVall®,
1200 g of n-butyl acrylate, and
5500 g of vinyl acetate.

Initiator solution:
30 g of ammonium persulfate in
800 g of water.

10% of the monomer mixture and 20% of the initiator solution are added under an ethylene pressure of 40 bar at an internal temperature of 45° C. The reaction mixture is heated up to 80° C. and the ethylene pressure is increased to 50 bar. After a reaction time of 20 minutes, the mixture is cooled to 65° C. The monomer mixture is uniformly metered in parallel to the initiator solution over a period of 5 hours. The ethylene pressure is kept constant at 50 bar, and when the metering has ended, the ethylene addition is stopped and the internal temperature is kept at this temperature for 2 hours. Most of the ethylene is subsequently gassed out, while stirring, and collected in a gasometer, and the residual monomer content is then reduced by the type of steam distillation already described.

Characteristic Data of Dispersion Example 5

| | |
|---|---|
| Dry matter: | 54% |
| pH (electrode measurement): | 4.6 |
| Brookfield viscosity, T = RT, Spindle 5, 20 rpm: | 2300 mPa.s |
| Residual monomer content: | <0.07% |
| Glass transition temperature of the polymer: | −14.1° C. |
| Ethylene content in the polymer: | 561 g |

Example 6

2 parts of $ZnCl_2$ are added to 100 parts of the dispersion of Example 3.

Example 7

1 part of $Al_2(SO_4)_3$ is added to 100 parts of the dispersion of Example 4.

Example 8

2 parts of $AlCl_3$ are added to 100 parts of the dispersion of Example 2.

Example 9

0.5 part of $FeCl_3$ is added to 100 parts of the dispersion of Example 1.

Comparison Example 1

An aqueous solution comprising the following constituents is introduced into a pressure apparatus with a stirrer, jacket heating and metering pumps:

4600 g of E water,
61 g of sodium acetate trihydrate,
757 g of a 20% strength aqueous solution of nonylphenol oxyethylated with 30 mol of ethylene oxide,
5891 g of a 5% strength aqueous hydroxyethylcellulose solution (viscosity of the 2% strength aqueous solution is 300 mPa.s),
246 g of a 30% strength aqueous sodium vinylsulfonate solution, and
15 g of a 1% strength aqueous solution of iron(II) sulfate heptahydrate.

The monomer mixture metered in is:

12847 g of vinyl acetate,
60 g of acrylic acid and methacrylic acid in a ratio of 1:5,
60 g of hydroxyethyl methacrylate and
148 g of vinyltrimethoxysilane.

The apparatus is freed from atmospheric oxygen and ethylene is forced into the apparatus. 2537 g of the monomer mixture and 10% of a reducing agent solution of 11.7 g of Rongalit in 860 g of water are metered in under an ethylene pressure of 20 bar at an internal temperature of 45° C. The mixture is heated up to an internal temperature of 60° C., during which the ethylene pressure rises to 50 bar. 10% of the initiator solution of 11.7 g of tert-butyl hydroperoxide in 860 g of water is now metered in and the mixture is cooled to remove the heat of reaction. The ethylene pressure is kept constant at 50 bar. The 90% of the reducing agent solution, the 90% of the initiator solution and the remaining monomers are metered in parallel in the course of 8 hours. Thereafter, a solution of 14.8 g of sodium persulfate in 344 g of water is metered in and the internal temperature is increased to 80° C. and kept at this temperature for 1 hour. Most of the unreacted ethylene is subsequently gassed out, while stirring, and collected in a gasometer, and 2 l of water are added. 2.6 l of water are then distilled off in the course of 2 hours, while applying a vacuum. The distillation is repeated once more.

Characteristic Data of Dispersion Comparison Example 1

| | |
|---|---|
| Dry matter: | 51% |
| pH (electrode measurement): | 4.8 |
| Residual monomer content: | 0.012% |
| Brookfield viscosity, T = RT, Spindle 5, 20 rpm: | 1800 mPa.s |
| Glass transition temperature of the polymer: | 7.1° C. |
| Ethylene content in the polymer: | 913 g |

Comparison Example 2 a) An aqueous solution comprising the following constituents is introduced into a pressure apparatus with a stirrer, jacket heating and metering pumps:

5100 g of E water, 150 g of a 20% strength aqueous solution of nonylphenol oxyethylated with 30 mol of ethylene oxide, 1.5g of sodium acetate trihydrate, 225 g of a 30% strength aqueous sodium vinyl sulfate solution, 1350 g of a 40% strength aqueous solution of sodium alkylaryl sulfate ethoxylated with 3 mol of ethylene oxide, 0.15 g of iron(II)sulfate, and 6 g of Rongalit.

The apparatus is freed from atmospheric oxygen and the monomer to be initially introduced is initially introduced into the apparatus. The initial monomer mixture comprises 9000 g of vinyl acetate.

Ethylene is then forced into the apparatus and the internal temperature is increased to 50° C. As soon as an ethylene pressure of 55 bar is reached, the ethylene addition is stopped and metering of the monomer emulsion (of 3000 g of n-butyl acrylate, 405 g of acrylic acid, 7.5 g of triallyl cyanurate, 270 g of a 48% strength solution of N-methylolacrylamide in 900 g of a 20% strength solution of sodium alkylaryl sulfate with 3 mol of ethylene oxide, 490 g of a 30% strength solution of an alkylaryl ethoxylate in 30 mol of ethylene oxide and 11.5 g of sodium acetate in 600 g of water), of the initiator of 75 g of tert-butyl hydroperoxide in 600 g of water and of the redox component of 75 g of Rongalit in 600 g of water) is started. The metering time is 4 hours for the monomer emulsion and 5 hours for the initiator solution and reduction solution. During the polymerization, the reaction temperature rises to 60° to 65° C.

The residual monomer content can be reduced by one of the processes described.

b) The same recipe can be repeated with the addition of 20 g of a 5% strength aqueous hydroxyethylcellulose solution (viscosity of the 2% strength aqueous solution is 300 mPa.s) to the initial mixture. The characteristic dispersion data remain unchanged.

Characteristic Data of Dispersion Comparison Example 2

| | |
|---|---|
| Dry matter: | 58% |
| pH (electrode measurement): | 4.0 |
| Brookfield viscosity, T = RT, spindle 3, 20 rpm: | 1800 mPa.s |
| Glass transition temperature of the polymer: | −10° C. |
| Ethylene content in the polymer: | 461 g |

Test of the gluing strength on Mipolam® 900 Color (H üls, Troisdorf).

To carry out the experiments, the gluings were stored under climatically controlled conditions at the stated temperatures and were then tested for their gluing strengths in accordance with the specification DIN 16860. The results are seen in Table 1.

TABLE 1

| | Tensile shear strength [N/cm$^2$] | | | Peel resistance [N/cm] | | |
|---|---|---|---|---|---|---|
| Example | 23° C. | 50° C. | 70° C. | 23° C. | 50° C. | 70° C. |
| 1 | 94 | 87 | 106 | 12 | 8 | 9 |
| 2 | 97 | 93 | 110*) | 11 | 7 | 10 |
| 3 | 94 | 101 | 113*) | 18 | 11 | 14 |
| 4 | 78 | 104*) | 114*) | 25 | 24 | 22 |
| 5 | 95 | 95 | 109*) | 16 | 10 | 13 |
| 6 | 98 | 105*) | 110*) | 22 | 19 | 17 |
| 7 | 81 | 105*) | 109*) | 26 | 26 | 25 |
| 8 | 98 | 95 | 106 | 12 | 12 | 15 |
| 9 | 94 | 93 | 103 | 15 | 13 | 16 |
| Comparison 1 | 89 | 78 | 101 | 4 | 2 | 3 |
| Comparison 2 | 80 | 78 | 88 | 5 | 5 | 5 |

*)Fracture in covering

Preparation of a Floor Adhesive

The floor adhesives used in the test are formulated in the following standard recipe for one-sided floor adhesives free from low-boiling components:

Floor adhesive:

15 parts of resin melt 35 parts of dispersion 45 parts of chalk (particle size 0–15 μm)

0.1 part of defoamer, for example Agitan® 305 (M ünzing Chemie, Heilbronn)

0.2 part of nonylphenol ethoxylate having EO numbers of 10–30 as a 10% strength solution 0.1 part of preservative, for example Mergal® K7 (Hoechst)

0.2 part of dispersing agent, for example Additol® XW 330 (Hoechst)

x parts of water for viscosity adjustment

The resin melt used for preparation of the adhesives comprises:

60 parts of colophony 30 parts of Alresat® KE300 (Hoechst)

10 parts of butyldiglycol acetate

The technical data of a one-sided floor adhesive prepared in this way are as follows:

| | |
|---|---|
| Solids content | about 80% |
| Viscosity (Brookfield Spindle 7/20 rpm): | 25000 mPa.s, pasty |
| Pot life: | about 50 minutes |

While the invention has been described with reference to certain preferred embodiments, numerous modifications, alterations, and changes to the preferred embodiments are possible without departing from the spirit and scope of the invention.

What is claimed is:

1. An aqueous dispersion which is prepared by aqueous polymerization of vinyl acetate, ethylene and more than 25% by weight based on the total weight of monomers employed of at least one comonomer selected from the group consisting of vinyl esters of aliphatic ($C_3$–$C_{18}$)-carboxylic acids, acrylic acid esters, methacrylic acid esters, and maleic acid diesters of aliphatic ($C_1$–$C_{18}$)-alcohols, in the presence of 0.05 to 0.95% by weight of α, β-unsaturated carboxylic acids, 0 to 0.95% by weight of methacrylic acid esters or acrylic acid esters which carry epoxide or hydroxyl groups, and 1.5 to 20% by weight of cellulose ether, in each case based on the total weight of the monomers employed to form an aqueous dispersion of a copolymer containing said cellulose ether in at least partly grafted form;

wherein said copolymer has a glass transition temperature of −40° to 0° C.

2. An aqueous dispersion as claimed in claim 1, where said glass transition temperature is −20° to −5° C.

3. An aqueous dispersion as claimed in claim 1, which comprises 1.7 to 15% by weight of said cellulose ether, based on the total weight of the monomers employed, in at least partly grafted form.

4. An aqueous dispersion as claimed in claim 1, wherein said cellulose ether comprises hydrophobically modified hydroxyethylcellulose.

5. An aqueous dispersion as claimed in claim 1, which comprises 50 to 70% by weight of vinyl acetate, 1.5 to 9% by weight of ethylene, and more than 25% by weight of one or more monomers selected from the group consisting of vinyl esters of aliphatic ($C_3$–$C_{12}$)-carboxylic acids, acrylic acid esters, methacrylic acid esters, and maleic acid diesters of aliphatic ($C_1$–$C_{12}$)-alcohols, in each based on the total weight of the monomers employed.

6. An aqueous dispersion as claimed in claim 1, which comprises more than 25% by weight of monomer units selected from one or more of the group consisting of 2-ethylhexyl acrylate and vinyl esters of α-dimethyl-branched carboxylic acids having 10 to 11 carbon atoms.

7. An aqueous dispersion as claimed in claim 1, which additionally comprises up to 10% by weight, based on the weight of the dispersion, of water-soluble metal salts.

8. An aqueous dispersion as claimed in claim 1, wherein the α, β-unsaturated carboxylic acid is selected from the group consisting of acrylic acid and methacrylic acid.

9. An aqueous dispersion as claimed in claim 8, wherein the copolymer comprises 0.15 to 0.45% by weight of the acid, based on the total weight of the monomers employed.

10. An aqueous dispersion as claimed in claim 1, wherein 0.1 to 0.95% by weight, based on the total weight of the monomers employed, of the methacrylic acid esters or acrylic acid esters which carry epoxide or hydroxyl groups, are used.

11. An aqueous dispersion as claimed in claim 1, which has a solids content of 40 to 65% and which comprises copolymer particles having a size of 0.02 to 1 μm.

12. An aqueous dispersion as claimed in claim 1, which is substantially free of organic solvents.

13. A process for preparing an aqueous dispersion, which comprises aqueous polymerization of vinyl acetate, ethylene, and more than 25% by weight based on the total weight of monomers employed of at least one comonomer selected from the group consisting of vinyl esters of aliphatic ($C_3$–$C_{18}$)-carboxylic acids, acrylic acid esters, methacrylic acid esters, and maleic acid diesters of aliphatic ($C_1$–$C_{18}$)-alcohols;

in the presence of 0.05 to 0.95% by weight of α,β-unsaturated carboxylic acids, 0 to 0.95% by weight of methacrylic acid esters or acrylic acid esters which carry epoxide or hydroxyl groups, and 1.5 to 20% by weight of cellulose ether, in each case based on the total weight of the monomers employed thereby forming an aqueous dispersion of a copolymer containing said cellulose ether in at least partly grafted form;

wherein said copolymer has a glass transition temperature of −40° to 0° C.

14. The process according to claim 13, which further comprises removing unreacted monomers by adding water and distilling off volatile organic constituents.

15. An adhesive comprising an aqueous dispersion as claimed in claim 1.

16. A polymeric material coated with an adhesive as claimed in claim 15.

17. A polyolefin coated with an adhesive as claimed in claim 15.

* * * * *